Jan. 1, 1952     P. R. MURRAY ET AL     2,580,453
REMOTE-CONTROL SYSTEM FOR AIRCRAFT
Filed Oct. 14, 1944     4 Sheets-Sheet 1

INVENTOR
PETER R. MURRAY
DONALD C. BRIGHT
BY
William D. Hall
ATTORNEY

Patented Jan. 1, 1952

2,580,453

UNITED STATES PATENT OFFICE 2,580,453

REMOTE-CONTROL SYSTEM FOR AIRCRAFT

Peter R. Murray and Donald C. Bright, Dayton, Ohio, assignors to the United States of America as represented by the Secretary of War Application October 14, 1944, Serial No. 558,708

7 Claims. (Cl. 250—2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in wireless remote control systems and more particularly to improvements in the means for controlling the remotely positioned equipment.

A great many attempts have been made to control models of equipment by wireless means and a measure of success has been attained but the art has lagged in the fulfillment of complete functional control of remotely positioned full-size equipment.

In accordance with the present invention, complete and positive control of all operational functions has been accomplished and the controls so arranged and designed that they simulate actual operating conditions.

It is, therefore, a prime object of this invention to provide a system of controls to perform any operational function of remotely positioned equipment.

A further object is to provide in combination with control means, means for transmitting and receiving the controlling intelligence through the medium of propagated electromagnetic energy.

A further object is to provide a safe positive remote control system for an airplane in flight.

These and further objects will become more apparent in the following description as exemplified and illustrated in the drawings, in which.

The system of remote control to be described is between a master station, where a controlling radio transmitter is located, and a controlled station, which in the embodiment described is located in an airplane and which controls the flight of the airplane. The controlled airplane will be called the slave plane.

In one embodiment of the system of this invention, the illustrated block diagram represents a control box 11 (Fig. 3), details of which will be fully described hereinbelow. The purpose of said control box is to select certain functional operations such as the control of propeller speed on an airplane preparing to take off from the ground and, in conjunction with such flight, the control of the various functions incident thereto.

Figure 1:
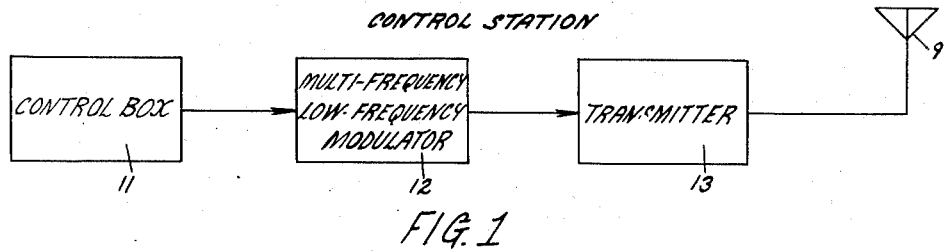
Figure 1 is a block diagram of the remote control transmitting system.

The aforementioned operation consists of selecting the desired operating function by actuating certain switches on the said control box 11, (Fig. 1), said switches in turn selecting a fixed low frequency from the multifrequency low frequency modulator 12 (Fig. 1), said frequency being predetermined and related to the desired operating function. The selected low frequency is fed into and frequency modulates the transmitter 13 (Fig. 1). The modulated carrier of the transmitter 13 is propagated into space via the antenna 9. The control signal consists of the several modulating frequencies. In some cases the degree of control exercised is proportional to the duration of modulation, in others the nature of the control is effected by the number of pulses of modulation, as will be hereinafter explained.

Figure 2:
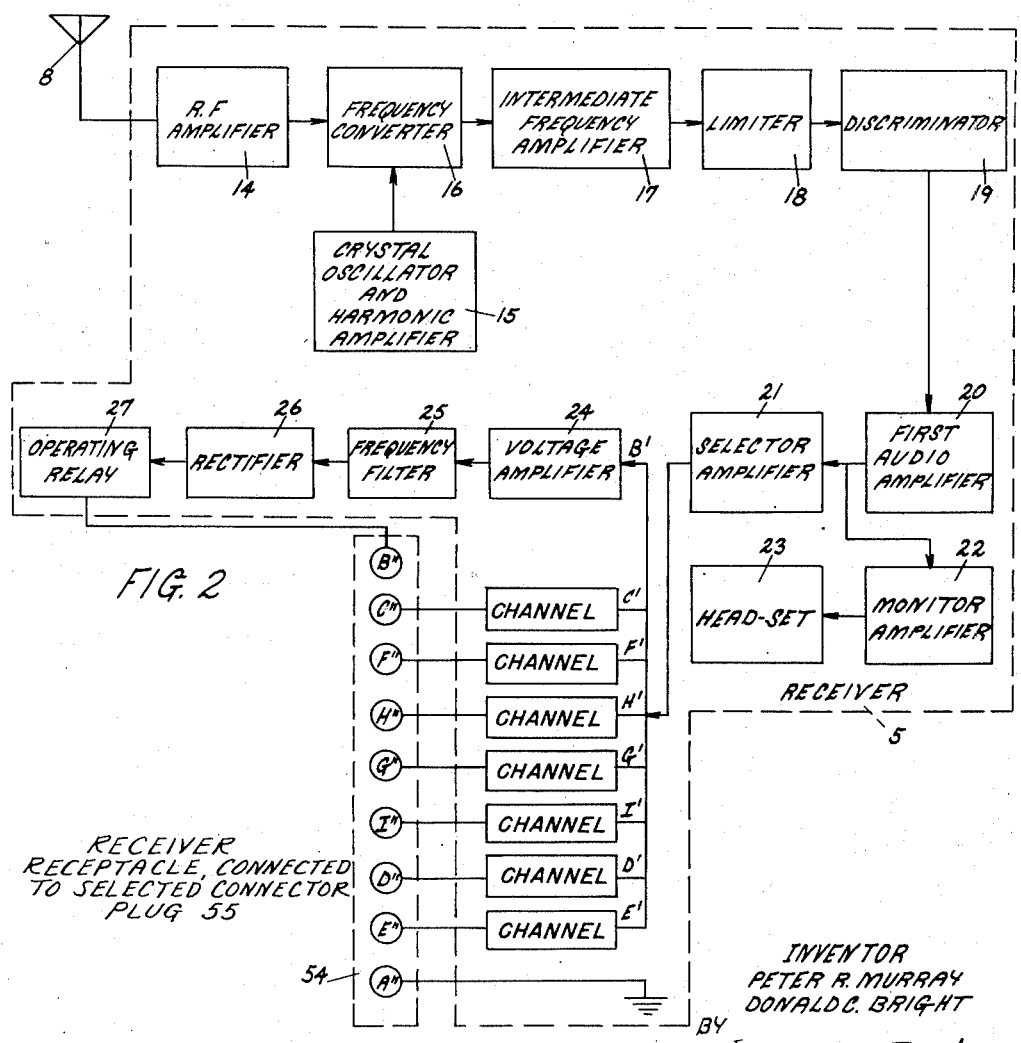
Figure 2 represents a block diagram of the receiving and selecting system of the invention.

The aforementioned modulated signal is intercepted by the antenna 8 of the receiving system, Figure 2. Radio frequency amplifier 14 amplifies the desired signal and rejects the image frequency to a considerable degree. The crystal oscillator and harmonic amplifier 15 generates a heterodyne signal by amplifying the fourth harmonic of the crystal oscillator and the heterodyne frequency is selected to be lower than the required signal frequency. The aforementioned two signals are combined in the usual manner in the converter stage 16 and the difference frequency amplified by the intermediate frequency amplifier 17.

The signal is then fed to the limiter stage 18 where any amplitude modulation due to noise impulses is removed to a considerable extent. Discriminator stage 19 converts the frequency variations of the incoming signal to audio frequency signals.

The audio frequency thus recovered is then amplified by the first audio amplifier 20 and the output of the amplifier 20 is fed, simultaneously, to the grid of the monitor amplifier 22 and the selector amplifier 21.

For test purposes a head set 23 is connected in the output of the monitor amplifier 22.

The output of the selector amplifier 21, whose relative value is indicated by an audio frequency meter (not shown), is fed to the multi-selector channels B', C', D', E', F', G', H', I', each of which comprises a voltage amplifier 24, frequency filter 25, rectifier 26 and operating relay 27. The component parts are shown only for channel B'. When the desired modulation frequency, as determined by the nature of the operational function selected, is present, the corresponding relay 27 in the selector channel will operate due to the increased plate current in the rectifier tube. It is seen that the action of frequency filter 25, rectifier 26, and operating relay 27 is to isolate a modulating signal of a particular frequency and produce a direct current voltage at output terminal B'' of channel B', which persists as long as the modulation continues and desists when the modulation ceases. In similar fashion modulations of the other frequencies are isolated in the channels marked C', F', H', G', I', D', E', and similarly direct current control voltages are produced at terminals C'', F'', H'', G'', I'', D'', E'' of receiver receptacle 54 of Fig. 2 whenever the corresponding modulation frequencies are received in receiver 5.

In selector unit 28 (Fig. 4) the control voltages are received on terminals B'' to I'' of selector connector plug 55, which plugs into receiver receptacle 54. These voltages are distributed by the several switches hereinafter to be described and routed to the several banks of terminals marked "To gyro section of servo" 70, "To valve section of servo" 58, and "Auxiliary functions socket," 72. From these terminals the voltages pass to the actual control mechanisms, which form no part of this invention.

Figure 3:
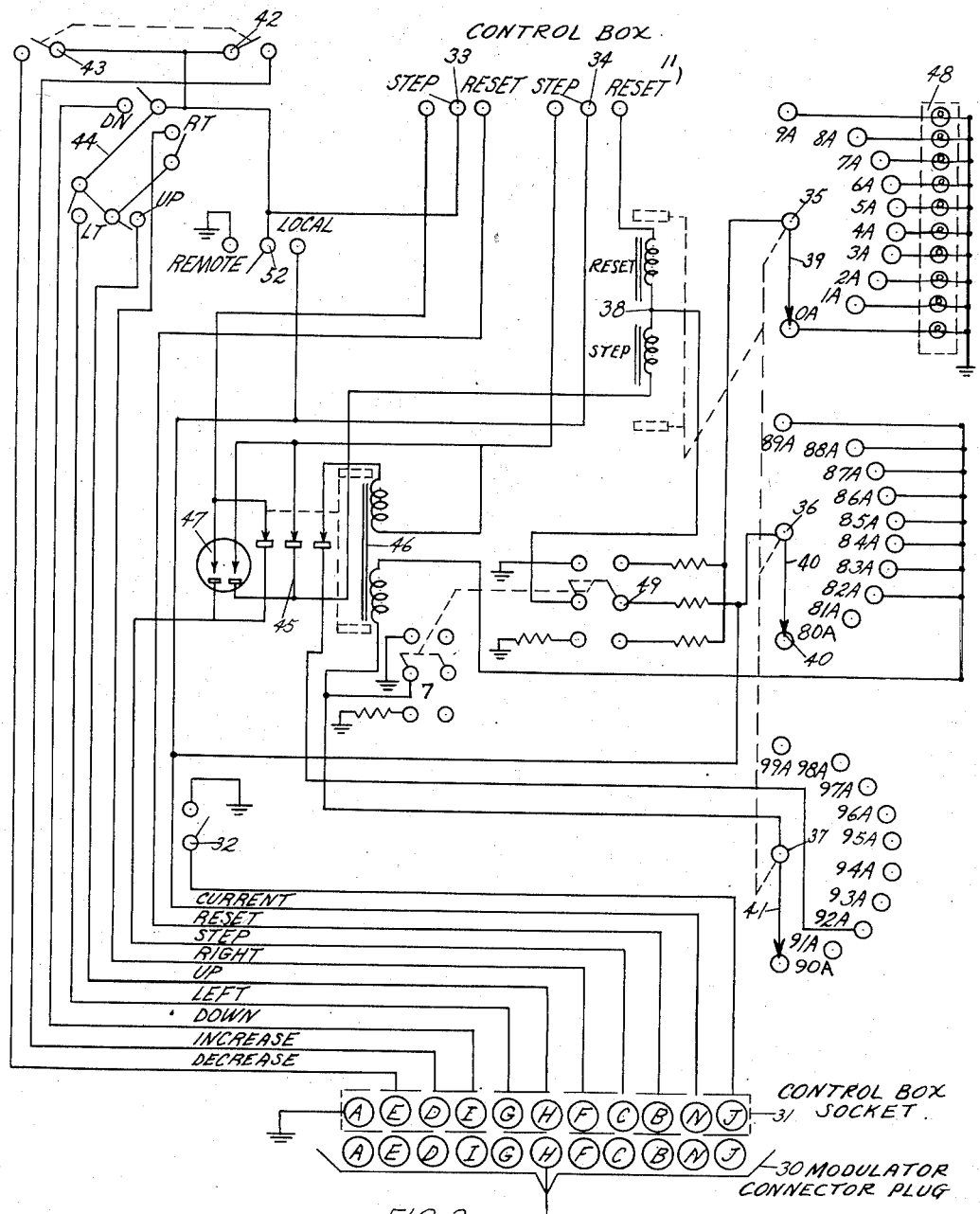
Figure 3 is a schematic diagram of a control unit used in combination with a transmitting unit.
Figure 4:
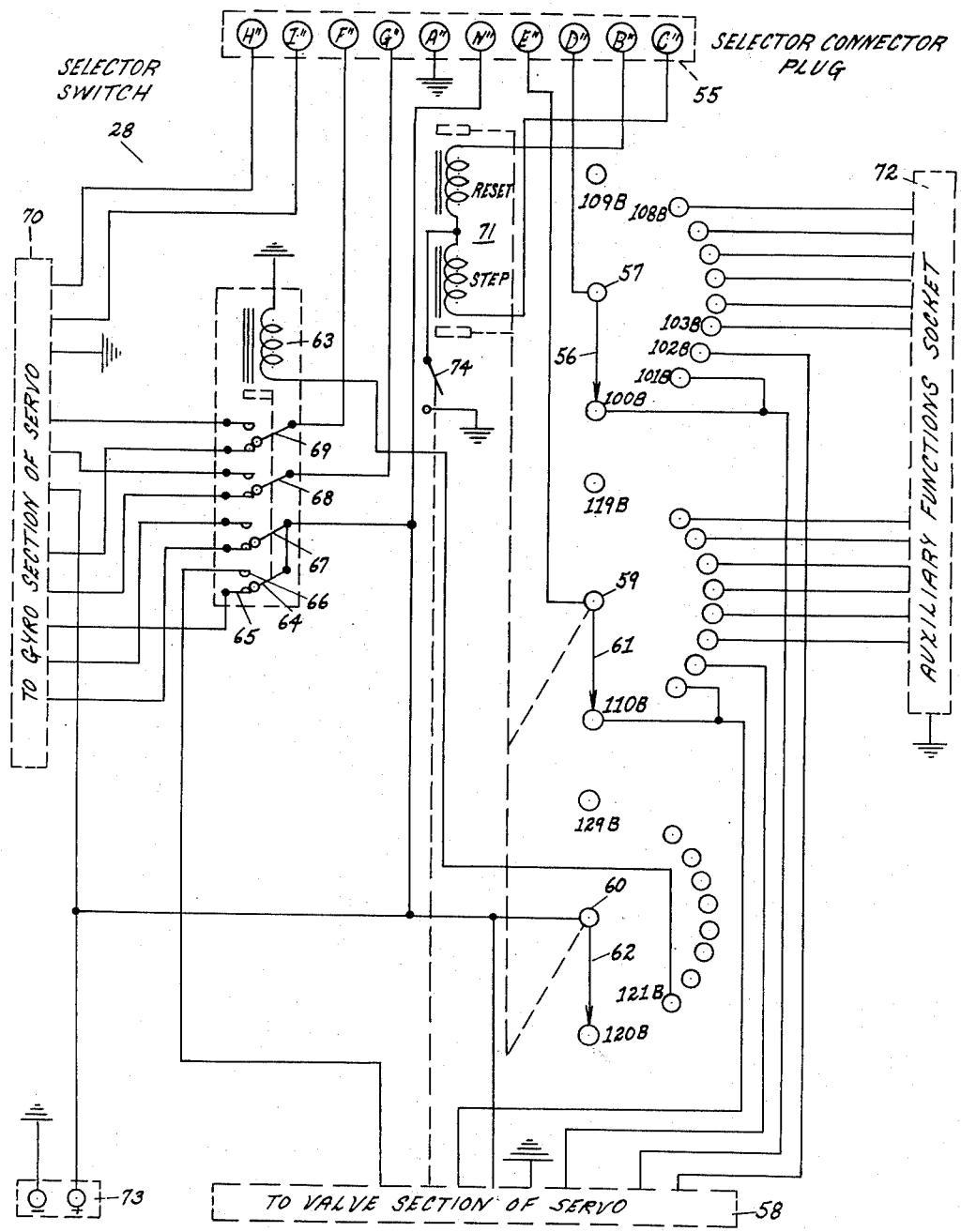
Figure 4 illustrates a schematic diagram of a function selector unit including relays and switches used in combination with a receiver located in the equipment to be controlled.

To further clarify the control functions of the invention, reference is had to Figures 3 and 4. Referring more particularly to Figure 3, the control box 11 comprises a multiconductor modulator connecting plug 30 which serves to connect the control box 11 to the multifrequency low-frequency modulator 12. Affixed to the control box 11 is a male type multiconductor socket 31 which is designed to receive the connector plug 30.

Figure 5:
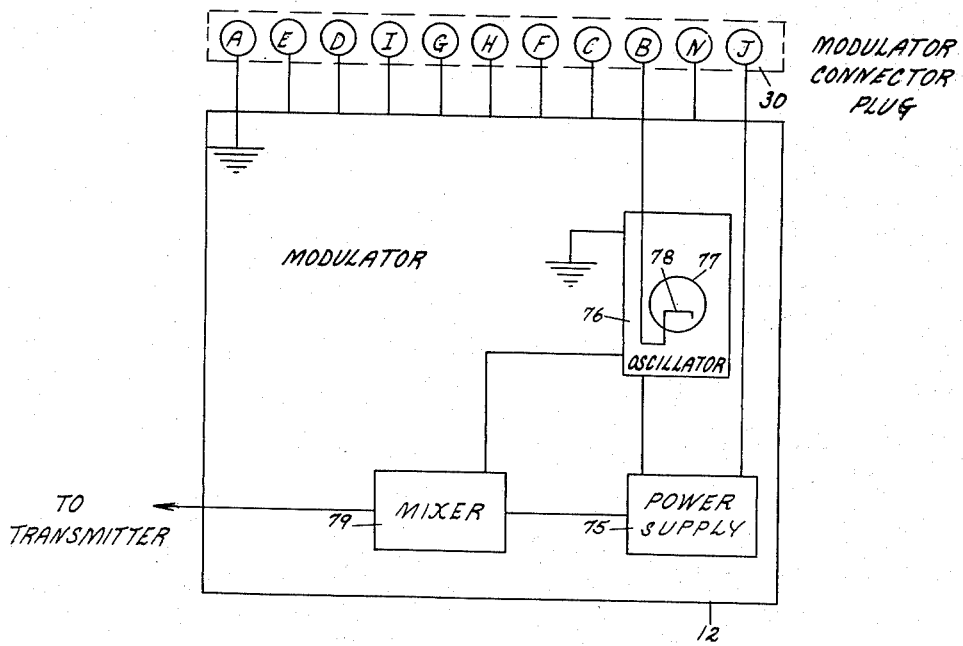
Figure 5 illustrates a detail of the circuit of the modulator of the remote control transmitting system.

Modulator 12 (Fig. 5) contains its own power supply 75 and a set of audio frequency oscillators each on a separate frequency. One only 76 is shown. Outputs of all the oscillators are collected in a mixer 79 and applied as modulation to a carrier in transmitter 13.

The means for keying the oscillator 76 is as follows: The oscillating tube 77 of oscillator 76 has its cathode 78 connected to terminal B of control box 11. Following the lead from terminal B it is seen this circuit passes through terminal Reset, through switch 33, through switch 52 (normally closed to terminal Remote) to ground in control box 11, through terminal A to ground in modulator 12 and back to oscillator 76. Thus closing and opening switch 33 controls the oscillation of oscillator 76, and controls the presence or absence of its respective modulation on the carrier in transmitter 13. Similarly applications of the other oscillations to the carrier are controlled by the several other switches in control box 11. All circuits have a common ground return through terminal A.

Terminal J connects to power supply 75 in modulator 12 and to switch 32 in control box 11, so that switch 32 is the master switch for modulator 12 turning it on and off.

Power supply for the relays and lamps of control box 11 is received from modulator 12 through terminal N. Switches 49 and 7 are ganged together. Thrown in the upward position they adapt the circuit for 12 volt supply, and in the downward position they adapt it for 24 volt supply. They are always closed one way or the other.

The types of control exercised by control box 11 are of two types. The first type is a pulse type and is controlled by switch 33. Closing switch 33 to terminal Reset causes the transmission of the modulation respective to the oscillator 76 connected. This is denominated the "reset signal." As will appear, the resulting control action in selector 28 is to bring the arms 56, 61 and 62 of stepping switches 57, 59 and 60 to the positions 100B, 110B and 120B respectively. This control is positive and is independent of the length of time switch 33 is closed (beyond a certain short minimum) and switches 57, 59, 60 stay in their positions after the reset signal is discontinued.

If switch 33 be thrown to Step the oscillator associated with terminal C puts the modulation on transmitter 13 which is denominated the "step signal." As will appear the resulting control action is to move the arms 56, 61 and 62 of stepping switches 57, 59 and 60, respectively, up one step. These switches move up one step for each closing of switch 33, and one step only, and remain in position when switch 33 is opened.

In order that the operator at the control box 11 may at all times know the positions occupied by step switches 57, 59 and 60 in selector 28 these switches are duplicated in control box 11 by step switches 35, 36 and 37. Switches 36 and 37 would not need to have so many steps or contacts as switch 35, but they are more readily procured as parts of a 3-deck switch having 10 contacts per deck. These three ganged switches are operated by a relay 38 in exactly the same manner as the ganged switches 57, 59 and 60 are operated by relay 71. Duplicating control switch 33 and ganged thereto is switch 34. When switch 33 is closed to Reset, switch 34 closes to Reset thereby passing current through the upper coil of relay 38 and pulling the arms 39, 40 and 41 of switches 35, 36 and 37 to reset positions 0A, 80A, 90A respectively. Similarly for each successive closing of switch 33 to Step position, switch 34 likewise closes to Step position and passes current through the lower coil of relay 38 thereby causing the arms 39, 40, 41 to move successively to contacts 1A, etc., 81A, etc., 91A, etc. Between terminals 1A, 2A, etc., and ground are placed lights, in bank 48 and current passes from arm 39 through that terminal on which it rests and through the connected lamp. The lamp by lighting indicates the position of arm 39 and also of arms 56, 61 and 62 in selector 28 and thereby the function which has been selected for control.

After the function to be controlled has been selected the actual control is accomplished by ganged switches 42 and 43. Each, on closing puts a distinctive modulation on the carrier from transmitter 13, denominated respectively "increase signal" and "decrease signal." In general the extent of control exercised by these signals is proportional to the signal's duration. Inasmuch as the two controls are opposed in their effects the switches 42 and 43 are ganged so that both cannot be closed together.

Provision is made in our remote control system for a very necessary safety feature. Certain control signals if inadvertently transmitted to the slave airplane might result in great damage thereto. Provision is therefore made so that switch 33 of control box 11 will not be operative in the Step position beyond the second step unless push button 47 also is closed. In terms of function, switch 33 following the sending of a Reset signal is operative to transmit the Step signal for one or two pulses, but in order to transmit a greater number of pulses push button 47 also must be closed. The operation of switch 34, by which the function to be selected in the remote selector 28 is indicated in control box 11, is similarly restricted and similarly released.

The means by which these results are accomplished are switches 36 and 37, double acting relay 46, and three-pole switch 45.

It will be seen that the circuit through the Step terminal of switch 33 passes in parallel paths through switch 45, the left contact, and push button 47, the left contact, so that when switch 45 is open the Step signal is inoperative unless push button 47 is closed.

Figure 6:
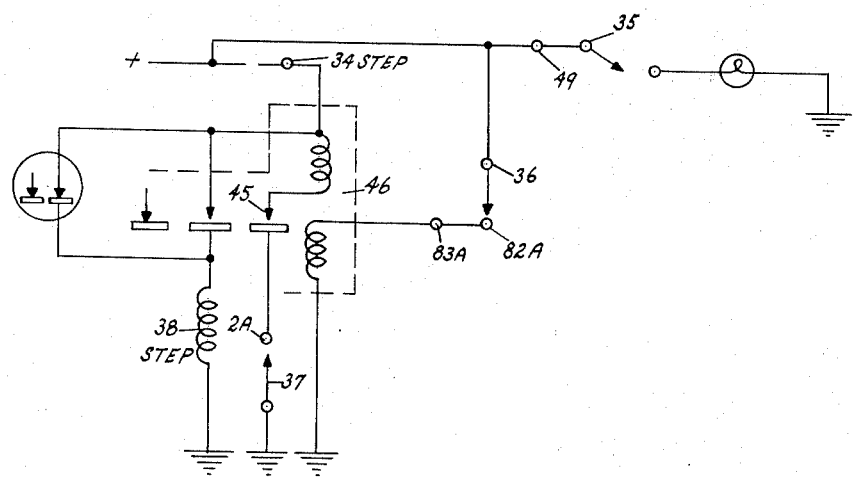
Figure 6 illustrates a detail of the circuit of the control box of the remote control transmitting system.

The manner in which switch 45 is opened and closed may be traced by reference to Fig. 6, which is an abstract of the pertinent parts from the circuit of control box 11 shown entire in Fig. 3.

Relay 46 shown in Figs. 3 and 6 is a double acting relay under the control of two coils, an upper and lower, as shown. Relay 46 operates to open switch 45 when current flows through its lower coil, but to hold switch 45 closed in the absence of current in its lower coil and also closed when current flows through both the upper and lower coils. It is seen that the current energizing the Step coil of relay 38 passes through the center contact of switch 45, and so the circuit which moves stepping switches 35, 36, 37 stepwise is inactive so long as switch 45 is open unless switch 47 be closed. And as long as arm 40 of switch 36 is on any of the terminals 83A–89A current through the lower coil of relay 46 does hold switch 45 open. Throwing switch 34 to Reset restores arm 40 of switch 36 to terminal 80A, current no longer flows through the lower coil of relay 46, and switch 45 again closes.

The operation when the stepping switches 35, 36 and 37 are stepped to the positions 2A, 82A, 92A is special. As switch 34 closes for a second pulse the arm 39, 40 and 41 are moved to make contacts with terminals 2A, 82A, 92A; current then flows through terminal 82A to the lower coil of relay 46 and also through terminal 92A to the upper coil of relay 46. Relay 46 therefore does not yet open switch 45. However, when switch 34 is opened at the conclusion of the pulse, the upper coil of relay 46 is deenergized, and the lower coil, still energized, then pulls the switch open. It is necessary to have a device of this character to delay the cut-off of the transmitted stepping pulse until a long enough pulse can be transmitted to remote receiver 5 to operate the stepping switches 57, 59 and 60 in remote selector 28.

Besides the controls exercised by the modulation signals in the circuits connected to terminals B, C, D, E of control box 11 there are four other controls carried by modulation signals generated in oscillators connected with terminals F, G, H, I and keyed by the four contacts of switch 44. These are contacts DN, RT, LT and UP. Any one of them, or any two adjacent, may be closed for the duration desired, the extent of the control exercised being proportional to the duration of the respective control modulation.

An account of the action of the control in the remote slave plane will now be given. As has been explained the control modulations received in remote receiver 5 are therein converted into direct current voltages, each in a separate circuit, and one for each modulation. These separate circuits enter selector 28 (see Fig. 4) at the respective terminals B''—I''. A'' is the terminal for the common ground return of all circuits. The terminals B''—I'' are lettered so that the voltages there appearing are in response to control currents set up at the corresponding terminals A—I in control box 11.

A direct voltage pulse appearing at B'' passes through the Reset coil of relay 71 through safety switch 74 to ground and returns through A''. This resets the arms 56, 61 and 62 of ganged stepping switches 57, 59 and 60 to the positions 100B, 110B and 120B, respectively. A voltage pulse appearing at C'' passes through the Step coil of relay 71 through safety switch 74 to ground and return through A''. This moves the arms 56, 61 and 62 up one step to terminals 101B, 111B, 121B and each successive pulse moves the switches one step further to terminals 102B, 112B, 122B, etc.

Safety switch 74 is ganged to the master switch in the servo unit 58. Turning this master switch off blocks all the remote controls on the slave airplane without, however, turning off receiver 5, which it may be desired to keep on so that it will be instantly available for communication or other purposes. The function of safety switch 74 is to prevent ganged switches 57, 59 and 60 from being inadvertently changed while the servo unit is out of operation.

It will be observed that switch 57 selects from several terminals marked "To valve section of servo" 58, and several terminals marked "Auxiliary functions" 72 one channel and connects it to terminal D'', similarly one other is selected from the same sets by switch 59 and connected to terminal E''. Thus a control voltage appearing at D'' in response to a control current initiated at D passes through a selected channel and terminal to operate a selected control on the slave plane. For voltage at D'' the control is an increasing one, the extent of increase depending on the duration of the control voltage. The channel selected by switch 59 is always for the opposite control to that selected by switch 57. Thus voltage at E'' is effective to reverse the control effected by voltage at D''.

Switch 60 is effective only in the position 121B to actuate relay 63. In that position current from grounded direct current power supply 73 is passed through the coil of relay 63 moving the arms of ganged switches 64, 67, 68, 69 to one set of contacts. In all other positions of switch 60 no current passes through the coil of relay 63 and the switch arms are pulled back by spring action to another set of contacts.

The control voltages appearing at terminals F'', G'' and voltage from supply 73 are thus connected at will to either of two groups of channels. These channels are connected at the bank of terminals 70 marked "To gyro section of servo." The channels connected with switch 60 in the 121B position carry control current to move the ailerons of the plane, the channels connected with switch 60 in the other positions carry current to move the rudder. Control voltage appearing at F'' is in response to control current applied at F and serves to turn the slave plane right. Similarly control voltage applied at G results in turning it left.

Separate control voltages at H'' and I'' are in response to control currents applied at H and I and control the elevators of the slave plane up and down respectively.

There is thus provided a complete positive remote control from a master station to a slave airplane.

There will now be described an additional feature of the equipment which is valuable. For testing of the remote control system it is desirable to eliminate the modulation and radio link. The circuits are so arranged that this may be done by plugging the terminals A—N of control box 11 directly into the corresponding terminals A″—N″ of the selector 28. For use of the equipment in this connection terminal N″ has been connected to the ungrounded side of power supply 73. In the test setup current enters control box 11 at terminal N from terminal N″ of selector 28 and serves to furnish the operating voltage for control box 11. In order that this current may appear at the terminals B—I switch 52 is thrown from the Remote position to the Local position. The return circuit is made through the connected grounded terminals A, A″. It will be seen that the control currents initiated in control box 11 now pass directly to selector 28 and form the control voltages to operate in selector 28 in exactly the same manner as when the radio link is interposed.

To illustrate further the number of operating functions possible using this embodiment of the invention, there is set forth herein the following table of operations together with controlling frequencies although the frequencies described are arbitrary values and others can and may be used.

| Function | Freq. | Step Position | | | | | |
|---|---|---|---|---|---|---|---|
| | | 0A | 1A | 2A | 3A | 4A | 5A |
| Increase | 700 | Throttle | Throttle | Brake On | Inc. Pitch | Up Flaps | Up Gear. |
| Decrease | 800 | ....do.... | ....do.... | Brake off | Dec. Pitch | Down Flaps | Down Gear. |
| Right | 900 | Rudder | Aileron | Rudder | Rudder | Rudder | Rudder. |
| Left | 1,000 | ....do.... | ....do.... | ....do.... | ....do.... | ....do.... | Do. |
| Up | 1,100 | Elevator | Elevator | Elevator | Elevator | Elevator | Elevator. |
| Down | 1,200 | ....do.... | ....do.... | ....do.... | ....do.... | ....do.... | Do. |

While the embodiment of the invention described hereinbefore is the preferred one, it will be obvious to those skilled in the art that application of the invention is possible to any type of mobile, stationary reciprocating, or stationary rotating equipment where remote control may be found useful.

What is claimed is:

1. A remote control system comprising a transmitter for transmitting a given carrier frequency wave; means coupled to said transmitter for generating a plurality of modulating frequency waves; selecting means connected to said generating means, for producing direct current control signals to select given ones of said modulating frequencies to be applied to said transmitter; means connected intermediate said transmitter and said generating means, for modulating said transmitter with said selected modulating frequency waves; a radio receiver tuned to said carrier frequency; a first plurality of means in said radio receiver, each of said means being responsive, respectively, to one of said modulating frequencies for producing a direct current control signal; a second plurality of direct current responsive means, each connected to a corresponding one of said first plurality of means; means for connecting said selecting means directly with said direct current responsive means so that said direct current control signals derived in said selecting means may be fed directly to the corresponding ones of said direct current responsive means without the necessity of transmitting and receiving modulated carrier frequency waves.

2. A remote control system comprising a transmitter of a given radio frequency; a plurality of normally inoperative oscillators, each of said oscillators being tuned to a given frequency; means connected to said plurality of oscillators for selectively energizing said oscillators; means connected intermediate said transmitter and said plurality of oscillators and responsive to the output of each of said oscillators for frequency modulating said transmitter; a receiver tuned to said radio frequency, including a demodulator; a plurality of channels connected to said demodulator, each of said channels being responsive only to one of said given oscillator frequencies, for producing a control signal; a plurality of control means connected to control a plurality of operating functions; selecting means connected intermediate said plurality of channels and said plurality of control means for selecting one of said control means in response to a given control signal; and regulating means connected intermediate said plurality of channels and the selected control means for regulating in response to other of said control signals the operation of said selected control means.

3. A system according to claim 2, wherein said means for selectively energizing said oscillators includes a stepping control switch connected to actuate a first of said oscillators and a reset control switch connected to actuate a second of said oscillators and wherein said selecting means comprises a stepping relay connected to be energized by the output of a first of said channels, said first channel being responsive to said first oscillator frequency, a reset relay connected to be energized by the output of a second of said channels, said second channel being responsive to said second oscillator frequency, a plurality of ganged stepping switches, each of said ganged switches having a given reference step, said ganged switches being connected to said stepping relay so that each time said relay is energized each of said ganged switches moves a single step in a given direction, said ganged switches being also connected to said reset relay so that each time said reset relay is energized each of said ganged switches returns to said reference step.

4. A system according to claim 3 and further including a control box connected to the transmitter having a second stepping relay connected so as to be energized by said stepping control switch, a second reset relay connected so as to be energized by said reset control switch, a plurality of second ganged stepping switches, each of said second ganged switches having a reference step, said second ganged switches being connected to said second stepping relay so that each time said second stepping relay is energized each of said plurality of second ganged switches moves a single step in a given direction, said second ganged switches being also connected to said second reset relay so that each time said second reset relay is energized each of said second ganged switches returns to its reference position, and a plurality of indicating light circuits, each connected so as to be energized from a given step of a given one of said second ganged stepping switches.

5. A system according to claim 4 and further including a safety circuit for the means for energizing said oscillators, said safety circuit comprising a safety relay connected to be energized from certain steps of another of said second ganged stepping switches, said safety relay being connected for disabling said first oscillator so that said first oscillator cannot be actuated by said stepping control switch, and a normally open switch connected to restore to its original condition said first oscillator when said switch is actuated.

6. A system according to claim 2 wherein said means for energizing said oscillators includes an increase switch connected to actuate a third oscillator, and a decrease switch connected to actuate a fourth oscillator and wherein said regulating means is connected to respond to the control signals derived from the frequency modulation components of said characteristic radio frequency corresponding to the outputs of said third and said fourth oscillators for regulating the operation of the selected control circuit.

7. A system according to claim 2 wherein said means for selectively energizing said oscillators comprises a four contact switch simulating in appearance the joy-stick of an aircraft, said switch being arranged so that any one contact or any two adjacent contacts may be closed, and a fifth, sixth, seventh, and eighth of said oscillators being connected, respectively, to be actuated from said four contacts.

PETER R. MURRAY.
DONALD C. BRIGHT.

REFERENCES CITED

The following references are of record in the file of this patent:

UNITED STATES PATENTS

| Number | Name | Date |
|---|---|---|
| 1,501,684 | Oswald | July 15, 1924 |
| 1,619,228 | Williams, Jr., et al. | Mar. 1, 1927 |
| 1,766,524 | Loftin | June 24, 1930 |
| 1,597,416 | Mirick | Aug. 24, 1936 |
| 2,325,829 | Boswau | Aug. 3, 1943 |
| 2,396,091 | De Bey | Mar. 5, 1946 |
| 2,397,088 | Clay | Mar. 26, 1946 |
| 2,397,477 | Kellogg | Apr. 2, 1946 |